United States Patent
Naitou

(10) Patent No.: US 7,660,053 B2
(45) Date of Patent: Feb. 9, 2010

(54) LENS BARREL AND IMAGING APPARATUS

(75) Inventor: Tsutomu Naitou, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/361,472

(22) Filed: Jan. 28, 2009

(65) Prior Publication Data

US 2009/0195898 A1     Aug. 6, 2009

(30) Foreign Application Priority Data

Jan. 31, 2008    (JP) .......................... P2008-020755

(51) Int. Cl.
  *G02B 7/02*    (2006.01)
  *G02B 15/14*   (2006.01)
(52) U.S. Cl. ........................ 359/819; 359/822; 359/702
(58) Field of Classification Search ................. 359/819, 359/822, 702
See application file for complete search history.

(56) References Cited

U.S. PATENT DOCUMENTS 5,181,144 A * 1/1993 Shirie et al. ................. 359/700
5,764,422 A * 6/1998 Miyamoto ................... 359/696

FOREIGN PATENT DOCUMENTS

| JP | 6-250068    | 9/1994 |
| JP | 2005-202316 | 7/2005 |

* cited by examiner

*Primary Examiner*—Jordan M. Schwartz
*Assistant Examiner*—James C Jones
(74) *Attorney, Agent, or Firm*—Finnegan, Henderson, Farabow, Garrett & Dunner, L.L.P.

(57) ABSTRACT

A lens barrel includes a lens frame movable in optical axis directions of a lens, a cam barrel rotated around outside the lens frame to move the lens frame in the optical axis directions, a base supporting the cam barrel to be rotatable and to be immovable in axial directions, and a hollow motor including a rotor and a stator and rotating the cam barrel. The stator supported by the base surrounds the rotor provided outside the cam barrel to be movable in the axial directions and rotate integrally with the cam barrel. As the rotor moves in one of the axial directions, a second locking portion of the base engages with a first locking portion of the rotor to prevent rotation of the rotor. A movement mechanism moves the rotor in the axial directions between a locking position and an unlocking position of the first and second locking portions.

9 Claims, 11 Drawing Sheets

FIG. 10

| | ROTOR 60 | ATTRACTIVE FORCE | REAR MOVEMENT COIL 68A | FRONT MOVEMENT COIL 68B |
|---|---|---|---|---|
| (1) | LOCKING POSITION | F1 > F2 | CURRENT UNSUPPLIED | CURRENT UNSUPPLIED |
| (2) | LOCKING POSITION ↓ UNLOCKING POSITION | F1 < F4 | CURRENT UNSUPPLIED | CURRENT SUPPLIED |
| (3) | UNLOCKING POSITION | F1 < F2 | CURRENT UNSUPPLIED | CURRENT UNSUPPLIED |
| (4) | UNLOCKING POSITION ↓ LOCKING POSITION | F2 < F3 | CURRENT SUPPLIED | CURRENT UNSUPPLIED |
| (5) | LOCKING POSITION | F1 > F2 | CURRENT UNSUPPLIED | CURRENT UNSUPPLIED |

LENS BARREL AND IMAGING APPARATUS

CROSS REFERENCES TO RELATED APPLICATIONS

The present invention contains subject matter related to Japanese Patent Application JP 2008-020755 filed in the Japanese Patent Office on Jan. 31, 2008, the entire contents of which are incorporated herein by reference.

BACKGROUND OF THE INVENTION

1. Field of the Invention

The present invention relates to a lens barrel and an imaging apparatus.

2. Description of the Related Art

An imaging apparatus, such as a digital still camera and a digital video camera, includes a lens barrel which houses an imaging optical system for guiding a subject image to an image pickup device.

The lens barrel is configured to perform a zooming or focusing operation by moving a part of a plurality of lenses constituting the imaging optical system in optical axis directions of the lenses.

In the past, there has been a mechanism for moving a lens in the optical axis directions, which is configured to include a lens frame holding the lens and provided to be movable in the optical axis directions, and a cam barrel rotatably provided around the outer circumference of the lens frame. In the configuration, the cam barrel is rotated with a cam groove thereof engaged with a cam pin provided to the lens frame. Thereby, the lens frame is moved in the optical axis directions via the cam groove and the cam pin.

In the above-described configuration, to drive and rotate a cam ring, the outer circumference of the lens barrel is provided with a motor and a deceleration mechanism including a plurality of gear trains for transmitting the rotational driving force of the motor to the cam ring.

In this case, a minute magnetic load (e.g., detent torque) exists in the motor. The deceleration mechanism increases such a load of the motor to maintain the rotational position of the cam barrel and thereby regulate the movement of the lens frame caused by external impact. In this case, the motor may be supplied with no current or a weak current.

To provide the above-described motor and deceleration mechanism to the outer circumference of the lens barrel, however, it is necessary to secure a space in the radial direction of the lens barrel. Therefore, the configuration has a limitation in reducing the size of the lens barrel.

In view of the above, a lens barrel has been proposed which drives a lens frame by directly rotating a cam barrel by the use of a so-called hollow motor having a cylindrical open space around the axial center of a rotor (see Japanese Unexamined Patent Application Publication No. 2005-202316). In the regulation of the movement of the lens frame according to the above technique, however, it is necessary to excite the hollow motor to stop the rotation of the cam barrel. Thus, the technique is disadvantageous in power saving.

Further, another technique has been proposed which locks and unlocks a locking claw with respect to a cam barrel via a solenoid and a link mechanism in a lens barrel using a hollow motor (see Japanese Unexamined Patent Application Publication No. 6-250068).

SUMMARY OF THE INVENTION

The latter related art, however, has a limitation in reducing the size of the lens barrel due to the occupation of a large space by the solenoid, the link mechanism, and the locking claw.

The present invention has been made in light of the above-described circumstances. It is desirable to provide a lens barrel and an imaging apparatus advantageous in power saving and size reduction.

According to an embodiment of the present invention, there is provided a lens barrel including a lens frame, a cam barrel, a base, and a hollow motor. The lens frame is configured to hold a lens and provided to be movable in optical axis directions of the lens. The cam barrel is provided and rotated around the outer circumference of the lens frame to move the lens frame in the optical axis directions. The base is configured to support the cam barrel to be rotatable and to be immovable in axial directions thereof. The hollow motor is configured to rotate the cam barrel. In the lens barrel, the hollow motor includes a cylindrical rotor provided around the outer circumference of the cam barrel and connected to the cam barrel to be movable in the axial directions of the cam barrel and to rotate integrally with the cam barrel, and a stator provided to surround the outer circumference of the rotor and supported by the base. Further, in the lens barrel, the rotor is provided with a first locking portion, and the base is provided with a second locking portion which, in accordance with the movement of the rotor in one of the axial directions of the cam barrel, engages with the first locking portion and prevents the rotation of the rotor. Further, in the lens barrel, a movement mechanism is provided which moves the rotor in the axial directions of the cam barrel between a locking position at which the first locking portion engages with the second locking portion and an unlocking position at which the first locking portion separates from the second locking portion.

Further, according to another embodiment of the present invention, there is provided an imaging apparatus including a lens barrel. The lens barrel includes a lens frame, a cam barrel, a base, and a hollow motor. The lens frame is configured to hold a lens and provided to be movable in optical axis directions of the lens. The cam barrel is provided and rotated around the outer circumference of the lens frame to move the lens frame in the optical axis directions. The base is configured to support the cam barrel to be rotatable and to be immovable in axial directions thereof. The hollow motor is configured to rotate the cam barrel. In the imaging apparatus, the hollow motor includes a cylindrical rotor provided around the outer circumference of the cam barrel and connected to the cam barrel to be movable in the axial directions of the cam barrel and to rotate integrally with the cam barrel, and a stator provided to surround the outer circumference of the rotor and supported by the base. Further, in the imaging apparatus, the rotor is provided with a first locking portion, and the base is provided with a second locking portion which, in accordance with the movement of the rotor in one of the axial directions of the cam barrel, engages with the first locking portion and prevents the rotation of the rotor. Further, in the imaging apparatus, a movement mechanism is provided which moves the rotor in the axial directions of the cam barrel between a locking position at which the first locking portion engages with the second locking portion and an unlocking position at which the first locking portion separates from the second locking portion.

The present invention moves the rotor in one of the axial directions of the cam barrel to make the first locking portion provided to the rotor and the second locking portion provided to the base engage with each other and thereby prevent the rotation of the hollow motor. Therefore, current supply to the hollow motor is unnecessary to prevent the rotation of the hollow motor. Accordingly, the present invention is advantageous in power saving. Further, it suffices if the first locking portion and the second locking portion are provided to the rotor and the base, respectively. Therefore, it is unnecessary to separately provide a special component to the lens barrel. Accordingly, the present invention is substantially advantageous in size reduction of the lens barrel.

BRIEF DESCRIPTION OF THE DRAWINGS

FIG. 10 is an explanatory diagram illustrating attractive forces and the states of a rear movement coil and a front movement coil observed when the rotor moves between the locking position and the unlocking position.

DESCRIPTION OF THE PREFERRED EMBODIMENTS

First Embodiment

Figure 1:
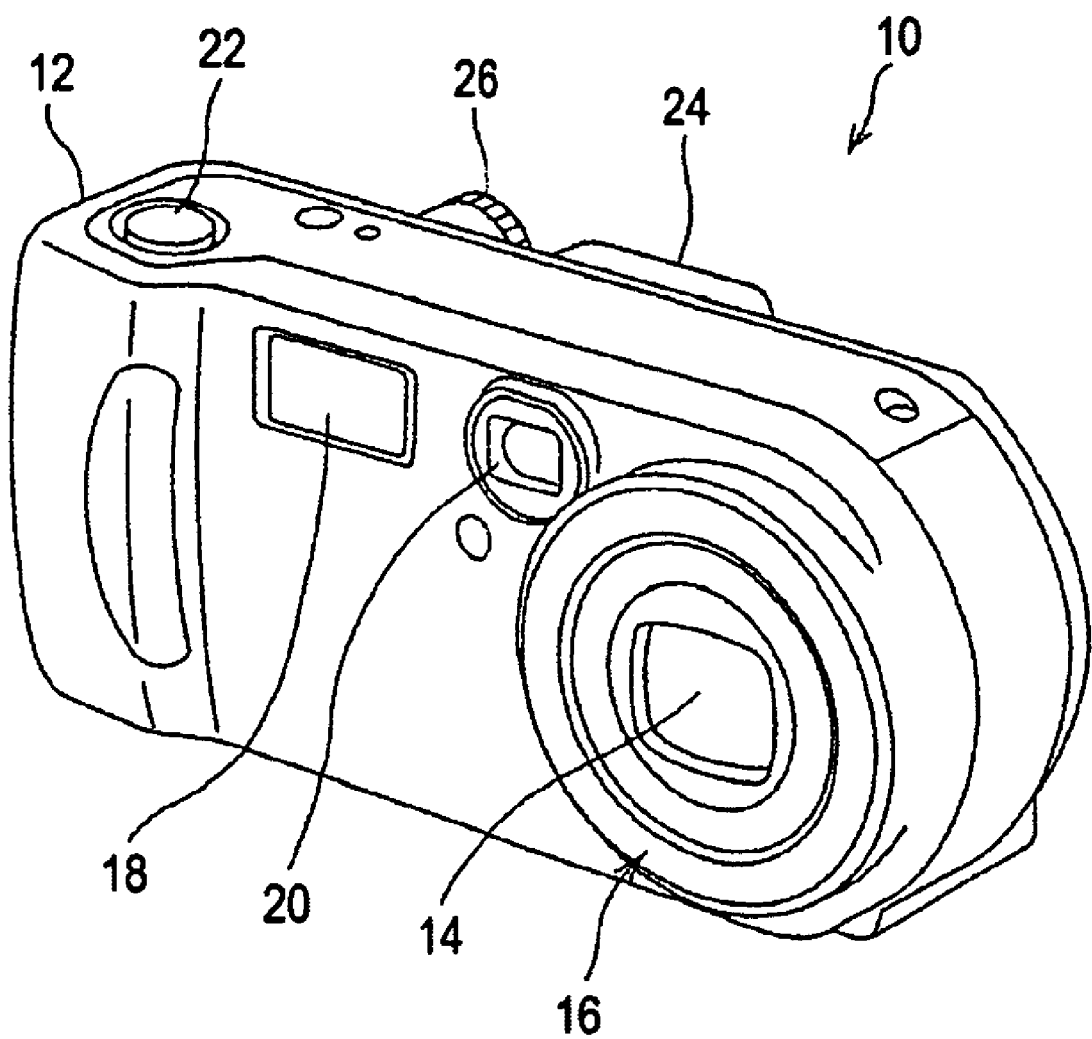
FIG. 1 is a perspective view of an imaging apparatus in a first embodiment.
Figure 2:
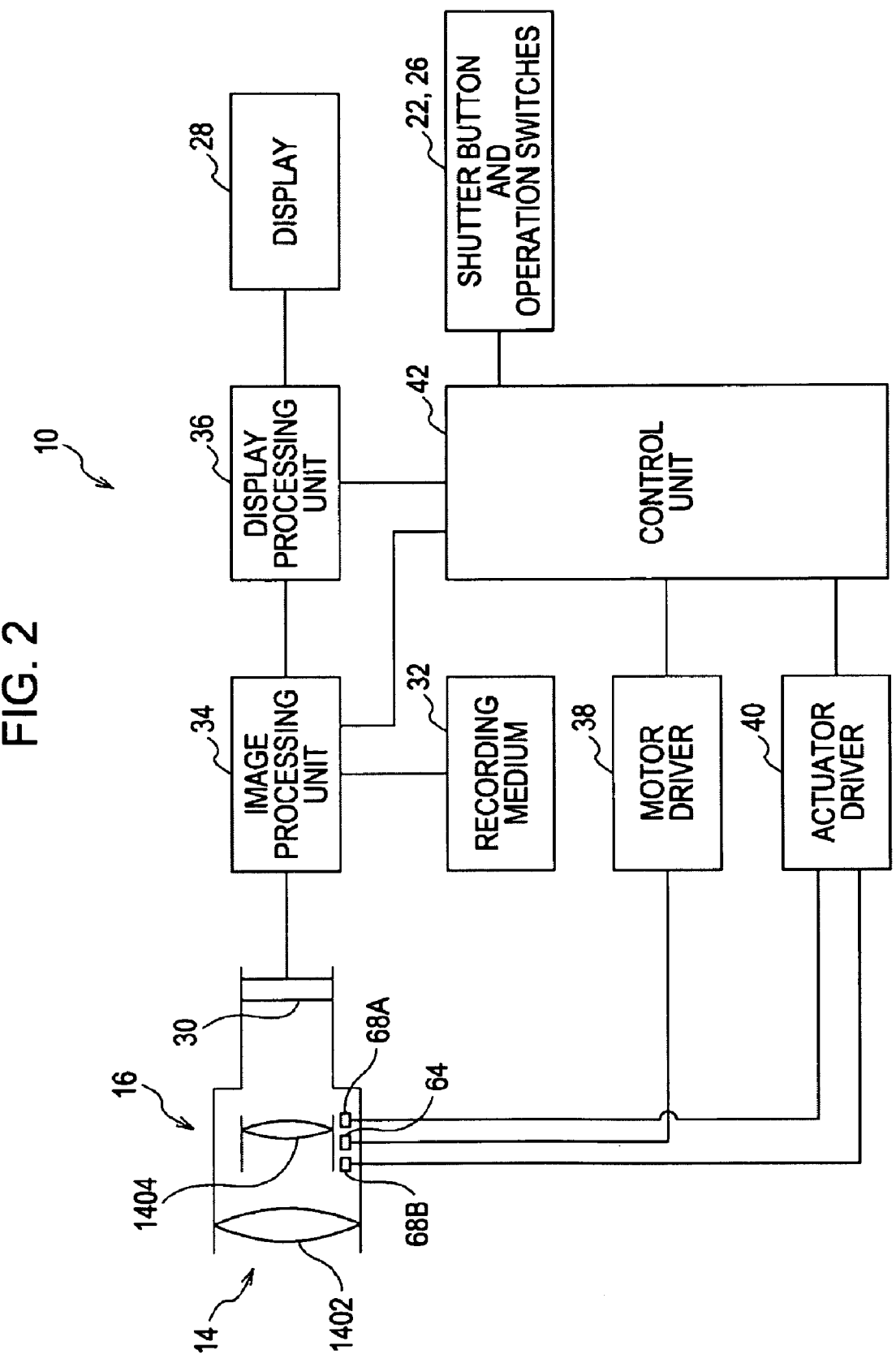
FIG. 2 is a block diagram illustrating a configuration of the imaging apparatus in the first embodiment.

An embodiment of the present invention will now be described with reference to the drawings. FIG. 1 is a perspective view of an imaging apparatus in a first embodiment, and FIG. 2 is a block diagram illustrating a configuration of the imaging apparatus in the first embodiment.

As illustrated in FIG. 1, the imaging apparatus 10 of the present embodiment is a digital still camera including a casing 12 forming the exterior of the camera. In the present specification, the side of a subject will be referred to as the front side, and the side opposite thereto will be referred to as the rear side.

At a rightward position on the front surface of the casing 12, a lens barrel 16 including therein an imaging optical system 14 is provided. At a rear end of the lens barrel 16, an image pickup device 30 (FIG. 2) is provided to pick up a subject image guided by the imaging optical system 14.

In the present embodiment, the imaging optical system 14 is configured to include a lens group 1402 and a focusing lens 1404. The lens group 1402 includes an objective lens disposed at a position closest to the subject. The focusing lens 1404 is moved in optical axis directions of the imaging optical system 14 to perform focusing of the subject image formed on an image pickup surface of the image pickup device 30 rearward of the lens group 1402.

At respective upper positions on the front surface of the casing 12, a flash unit 18 which emits a flash of light, an objective lens 20 of an optical viewfinder, and so forth are provided. In the present specification, the front side will refer to the subject side, while the rear side will refer to the image forming side.

The upper end surface of the casing 12 is provided with a shutter button 22. The rear surface of the casing 12 is provided with an eyepiece window 24 of the optical viewfinder, a plurality of operation switches 26 for performing a variety of operations, such as turning on and off of a power supply and switching between an imaging mode or a replay mode, a display 28 (FIG. 2) which displays the captured image, and so forth.

As illustrated in FIG. 2, the imaging apparatus 10 includes the image pickup device 30, a recording medium 32, an image processing unit 34, a display processing unit 36, a motor driver 38, an actuator driver 40, a control unit 42, and so forth.

The image pickup device 30 includes the image pickup surface, and is formed by a CCD (Charge-Coupled Device) or a CMOS (Complementary Metal-Oxide Semiconductor) sensor, which picks up the subject image formed on the image pickup surface by the imaging optical system 14 and generates an image pickup signal. The image processing unit 34 generates image data on the basis of the image pickup signal output from the image pickup device 30, and records the image data on the recording medium 32. The recording medium 32 is formed by a memory card installed in and removed from a memory slot provided to the casing 12, a memory installed inside the casing 12, or the like. The display processing unit 36 displays on the display 28 the image data supplied by the image processing unit 34. The motor driver 38 drives a stator coil 64 of a hollow motor 48 described later. The actuator driver 40 drives movement coils 68 (68A and 68B) described later. The control unit 42 is formed by a CPU (Central Processing Unit) or the like which controls the image processing unit 34, the display processing unit 36, the motor driver 38, and the actuator driver 40 in accordance with the operation of the operation switches 26 and the shutter button 22.

Figure 3:
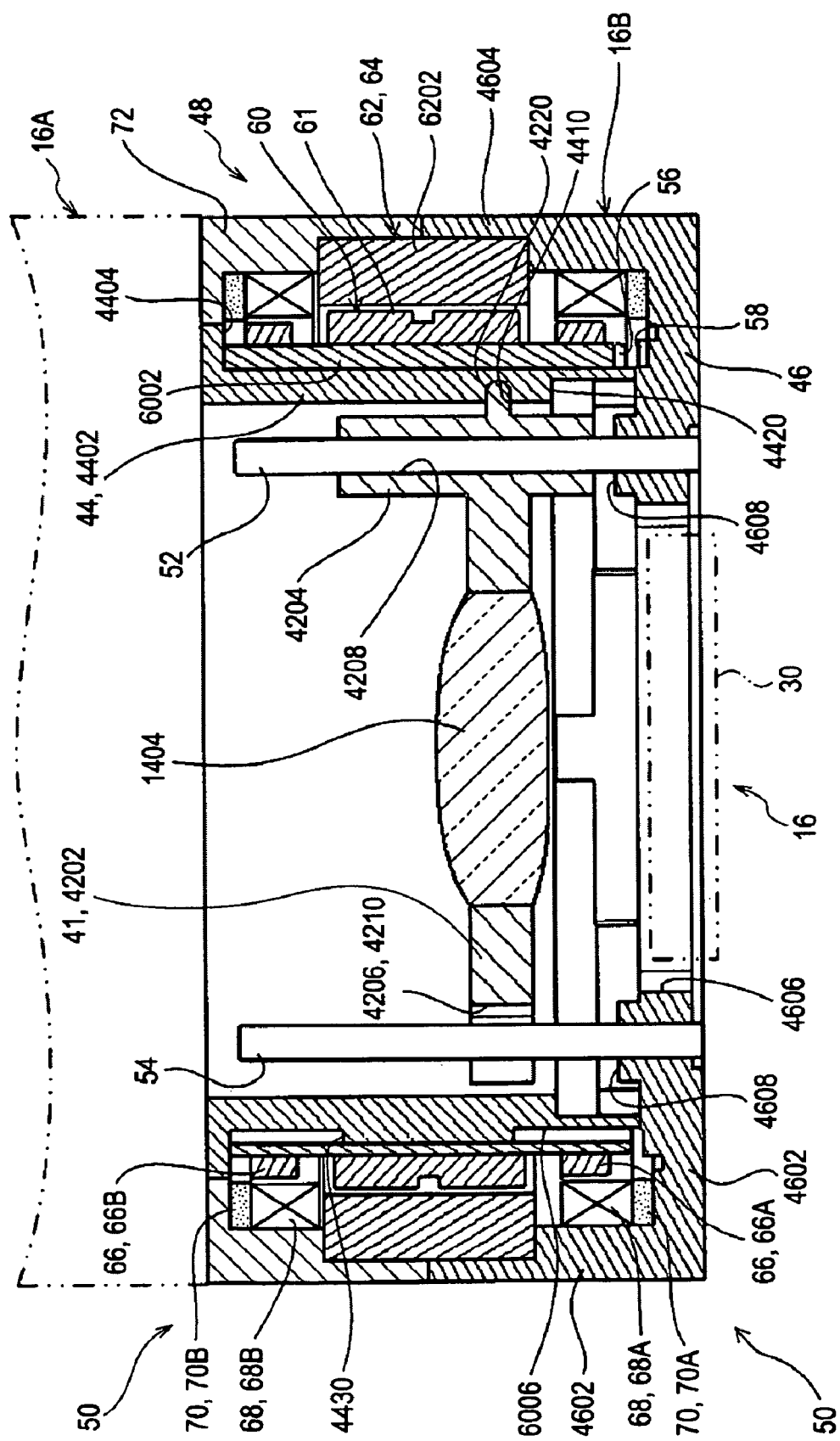
FIG. 3 is a cross-sectional view of a lens barrel, illustrating an unlocking position of a rotor.
Figure 4:
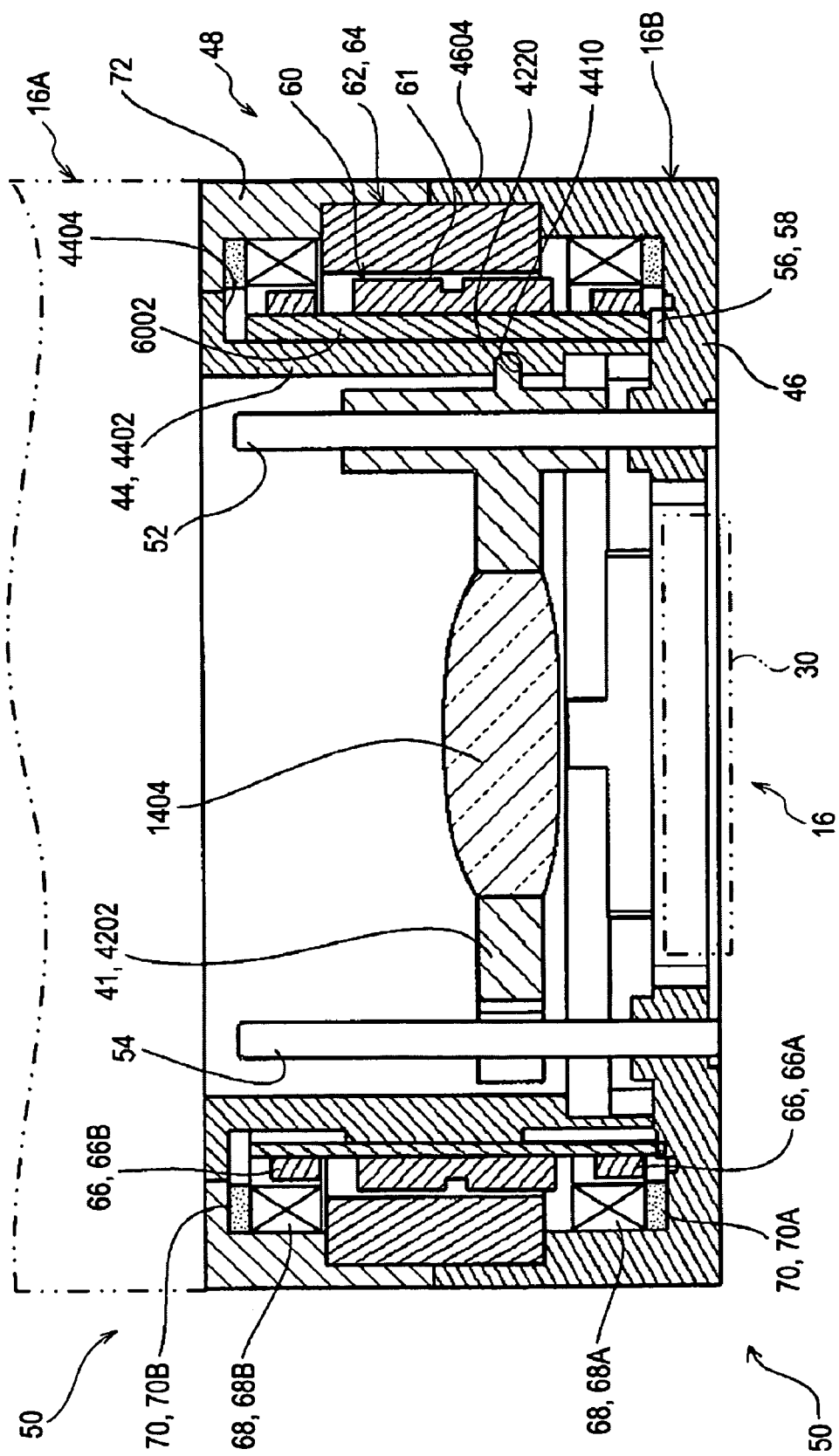
FIG. 4 is a cross-sectional view of the lens barrel, illustrating a locking position of the rotor.
Figure 5:
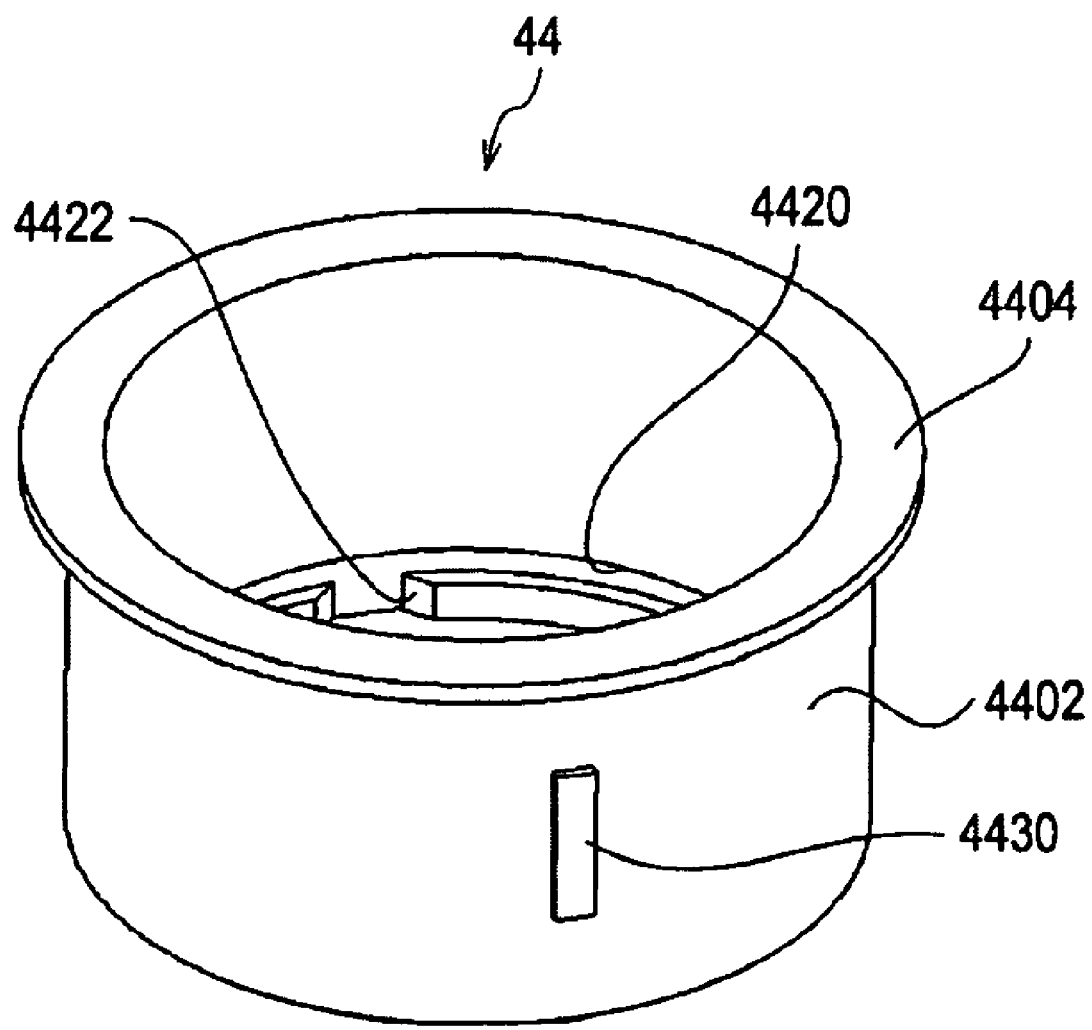
FIG. 5 is a perspective view of a cam barrel.
Figure 6:
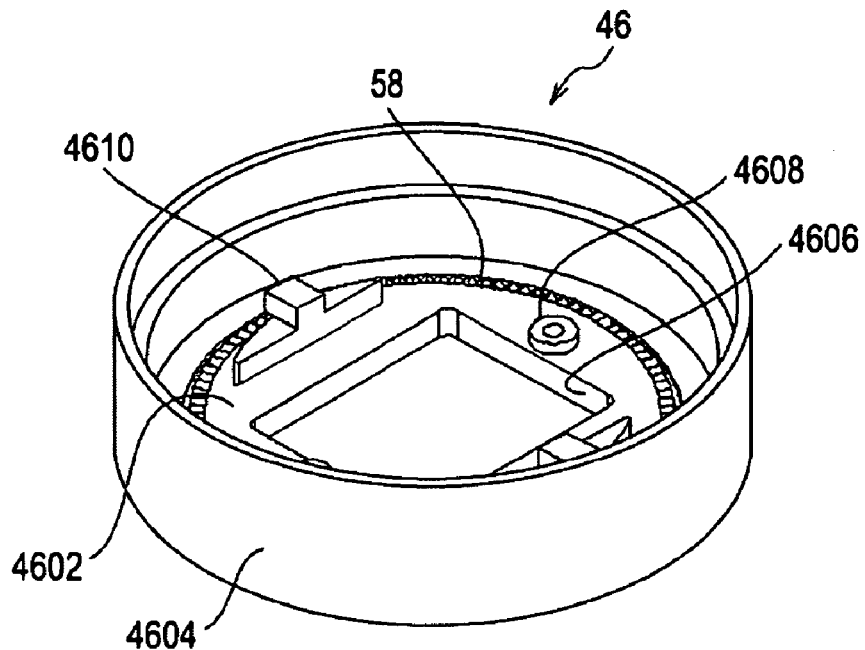
FIG. 6 is a perspective view of a base.
Figure 7:
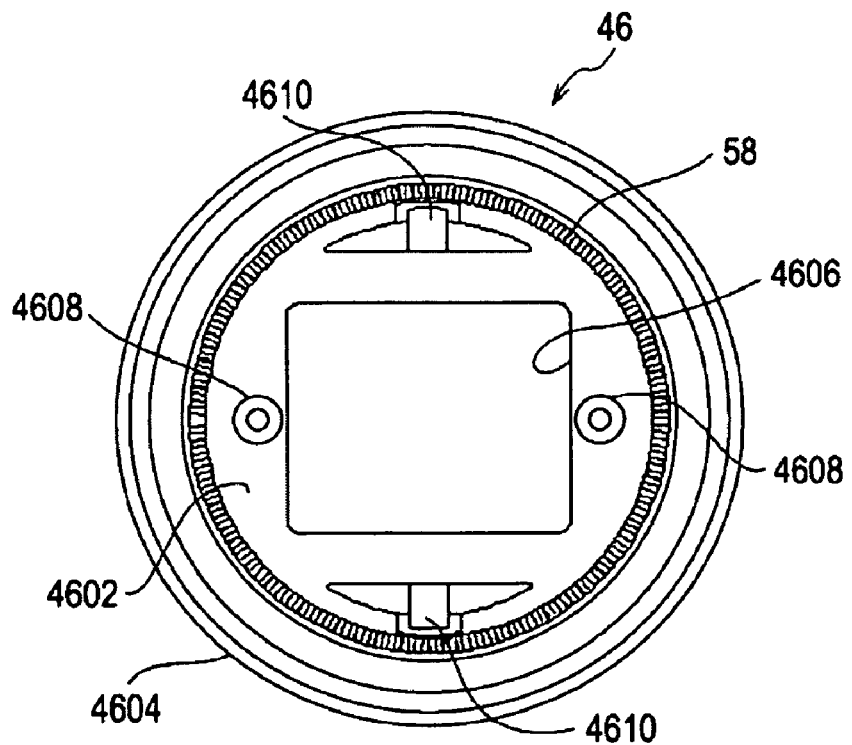
FIG. 7 is a plan view of the base.
Figure 8:
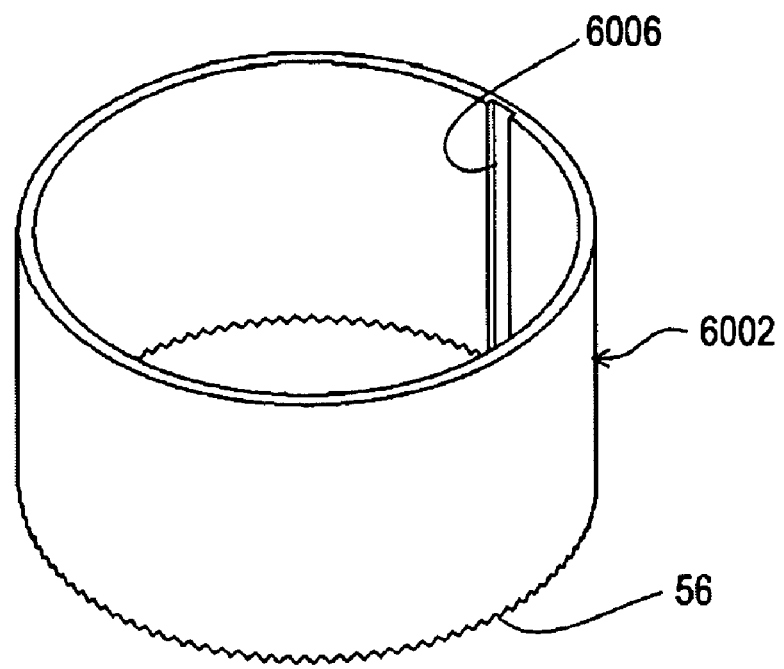
FIG. 8 is a perspective view of a cylindrical member.
Figure 9:
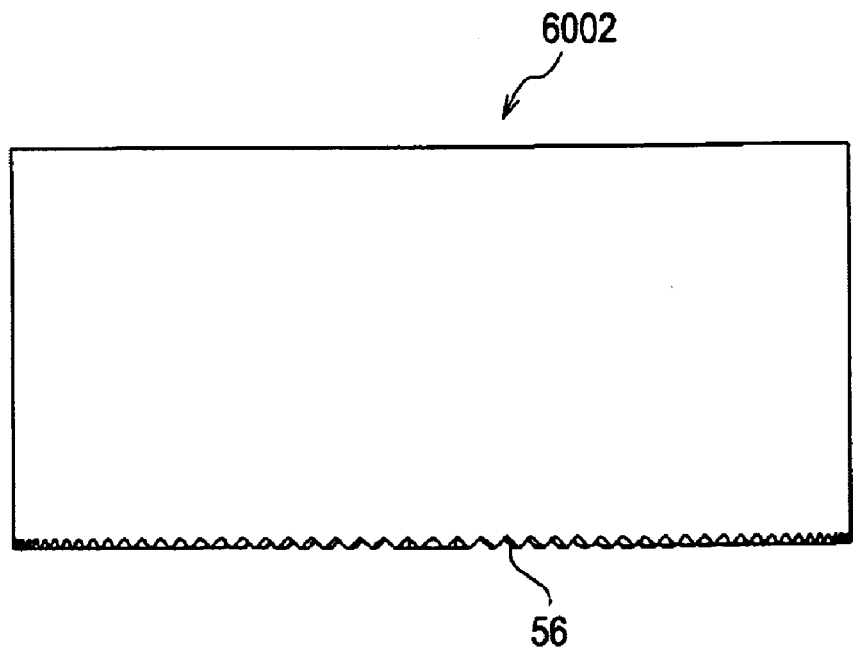
FIG. 9 is a side view of the cylindrical member.

Subsequently, essential parts of the present invention will be described. FIG. 3 is a cross-sectional view of the lens barrel 16, illustrating an unlocking position of a rotor 60. FIG. 4 is a cross-sectional view of the lens barrel 16, illustrating a locking position of the rotor 60. FIG. 5 is a perspective view of a cam barrel 44. FIG. 6 is a perspective view of a base 46, and FIG. 7 is a plan view of the base 46. FIG. 8 is a perspective view of a cylindrical member 6002, and FIG. 9 is a side view of the cylindrical member 6002.

As illustrated in FIG. 3, the lens barrel 16 is configured to include a front barrel portion 16A housing the lens group 1402, and a rear barrel portion 16B connected to a rear portion of the front barrel portion 16A and housing the image pickup device 30 and the focusing lens 1404. The rear barrel portion 16B includes a lens frame 41, the cam barrel 44, the base 46, the hollow motor 48, a movement mechanism 50, and so forth.

The lens frame 41 includes a circular plate portion 4202 holding the outer circumference of the focusing lens 1404, and a first guide portion 4204 and a second guide portion 4206 provided at mutually facing positions on the circular plate portion 4202.

The first guide portion 4204 is formed with a through hole 4208, through which a main guide shaft 52 extending parallel to the optical axis of the imaging optical system 14 including the focusing lens 1404 is movably inserted. The second guide portion 4206 is formed with a cut-out portion 4210, through which a sub guide shaft 54 extending parallel to the optical axis of the imaging optical system 14 including the focusing lens 1404 is movably inserted.

The lens frame 41 is supported to be movable in the optical axis directions of the imaging optical system 14 along the main guide shaft 52, and is prevented from rotating around the main guide shaft 52 by the sub guide shaft 54. Further, an outer circumferential portion of the lens frame 41 is provided with provided with a cam pin 4220. In the present embodiment, the cam pin 4220 is provided to the first guide portion 4204.

The cam barrel 44 is provided and rotated around the outer circumference of the lens frame 41 to move the lens frame 41 in the optical axis directions. As illustrated in FIGS. 3 and 5, the cam barrel 44 includes a cylindrical portion 4402 housing the lens frame 41, and a stopper 4404 of a circular plate shape provided to an end portion of the cylindrical portion 4402. The inner circumferential surface of the cylindrical portion 4402 is formed with a cam grove 4410 which engages with the cam pin 4220. Therefore, as the cam barrel 44 rotates, the lens frame 41 moves in one of the optical axis directions. A portion near one end in the axial directions of the inner circumferential surface of the cylindrical portion 4402 is formed with a circular groove 4420. At mutually facing regions of the circular groove 4420, cut-out portions 4422 are provided which lead the regions to the one end in the axial directions of the cylindrical portion 4402. The outer circumferential surface of the cylindrical portion 4420 is provided with a projection 4430 extending in the axial directions.

As illustrated in FIG. 3, the base 46 supports the main guide shaft 52 and the sub guide shaft 54, and is attached with the image pickup device 30. As illustrated in FIGS. 6 and 7, the base 46 includes a disk-shaped bottom wall 4602 extending on a plane perpendicular to the axial directions of the cam barrel 44, and a circumferential wall 4604 standing upright from the circumference of the bottom wall 4602. The center of the bottom wall 4602 is provided with a rectangular cut-out portion 4606, in which the image pickup device 30 is housed and attached. It is now assumed that one of the axial directions of the cam barrel 44 separating from the bottom wall 4602 (the image pickup device 30) is the forward direction. In this case, the lens frame 41 and the cam barrel 44 are located forward of the bottom wall 4602. Further, the inner surface of the bottom wall 4602 facing the lens frame 41 and the cam barrel 44 is provided with boss portions 4608, in which an end portion of the main guide shaft 52 and an end portion of the sub guide shaft 54 are inserted and attached, respectively. Further, an outer circumferential portion of the inner surface of the bottom wall 4602 is formed with a second locking portion 58, which is formed by an alternate sequence of concave and convex portions extending over the entire circumference of the outer circumferential portion. Further, at mutually facing positions on the inner surface of the bottom wall 4602, two locking claws 4610 are provided to project outward in the radial direction of the bottom wall 4602. The two locking claws 4610 are inserted in the circular groove 4420 via the cut-out portions 4422 of the cam barrel 44 to be locked in the circular groove 4420. Thereby, the cam barrel 44 is supported by the base 46 to be rotatable and to be immovable in the axial directions.

The hollow motor 48 rotates the cam barrel 44. In the present embodiment, the hollow motor 48 is formed by a stepping motor. As illustrated in FIG. 3, the hollow motor 48 includes the rotor 60 and a stator 62.

The rotor 60 is configured to include a cylindrical member 6002 and a rotation magnet 61 attached to the outer circumferential surface of the cylindrical member 6002. In the present embodiment, the rotation magnet 61 has been subjected to multipolar magnetization. The cylindrical member 6002 has a cylindrical shape, and the inner circumferential surface of the cylindrical member 6002 is formed with a guide groove 6006, which extends in the axial directions, and with which the projection 4430 of the cam barrel 44 is connected to be movable in the axial directions. The cylindrical member 6002 is provided outside the cam barrel 44, and the projection 4430 is connected with the guide groove 6006. Thereby, the rotor 60 is provided to be movable in the axial directions of the cam barrel 44 and to rotate integrally with the cam barrel 44.

The stator 62 includes the stator coil 64 provided to surround the outer circumference of the cylindrical member 6002. The stator coil 64 is supported by the base 46. Supplied with a drive current via the motor driver 38, the stator coil 64 generates a magnetic field. Due to magnetic mutual action between the magnetic field of the stator coil 64 and the magnetic filed of the rotation magnet 61 of the rotor 60, drive force in the rotational direction is generated in the rotor 60.

As illustrated in FIGS. 8 and 9, the rear end of the cylindrical member 6002, i.e., an end portion in the axial directions of the cylindrical member 6002 is provided with a first locking portion 56, which engages with the second locking portion 58 to be engageable with and disengageable from the second locking portion 58. As illustrated in FIG. 4, as the first locking portion 56 and the second locking portion 58 lock with each other, the rotation of the rotor 60 is prevented. That is, the base 46 (the bottom wall 4602) is provided with the second locking portion 58 which, in accordance with the movement of the rotor 60 in the rearward direction, i.e., one of the axial directions of the cam barrel 44, engages with the first locking portion 56 and prevent the rotation of the rotor 60.

Figure 12:
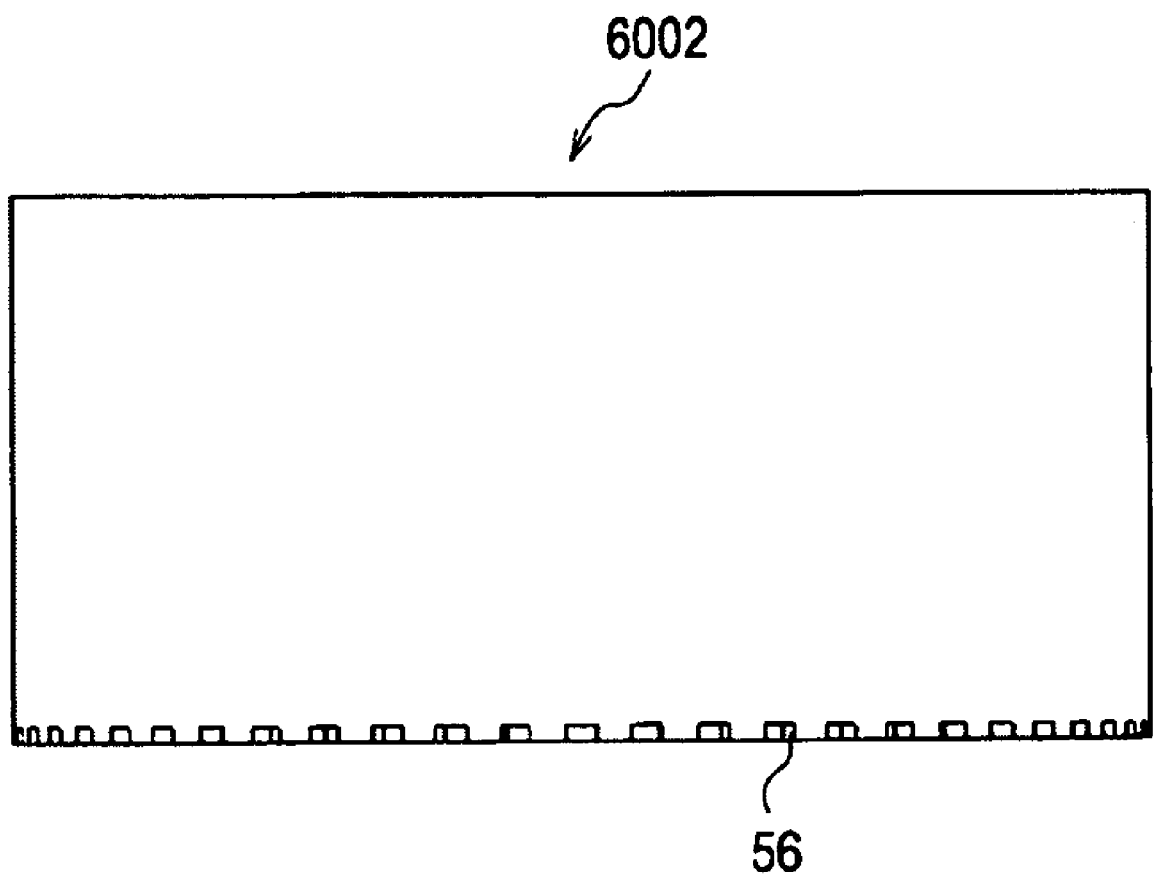
FIG. 12 is a side view of the cylindrical member in a modified example.

The first locking portion 56 and the second locking portion 58 may be formed by concave and convex portions of triangular waveforms as illustrated in FIG. 9, or may be formed by rectangular concave and convex portions as illustrated in FIG. 12. In short, the first locking portion 56 and the second locking portion 58 can be of any shape, as long as the engagement between the first locking portion 56 and the second locking portion 58 prevents the rotation of the rotor 60. Therefore, a variety of publicly known existing concave and convex shapes can be employed as the shape of the first locking portion 56 and the second locking portion 58.

A portion of the cylindrical member 6002 away from the second locking portion 58 in one of the axial directions is provided to be contactable with the stopper 4404. As illustrated in FIG. 3, as the portion of the cylindrical member 6002 comes into contact with the stopper 4404, the cylindrical member 6002 is prevented from moving in a direction separating from the second locking portion 58.

The movement mechanism 50 moves the rotor 60 in the axial directions of the cam barrel 44 between the locking position (FIG. 4) at which the first locking portion 56 engages with the second locking portion 58 and an unlocking position (FIG. 3) at which the first locking portion 56 separates from the second locking portion 58. The movement mechanism 50 is configured to include movement magnets 66, the movement coils 68, and magnetic members 70. The movement magnets 66 are respectively attached to both ends in the axial directions of the outer circumferential surface of the cylindrical member 6002. In the present embodiment, each of the movement magnets 66 is formed by a monopolarly magnetized magnet. Each of the movement coils 68 is supported by the base 46 and provided to face the corresponding one of the movement magnets 66. Each of the magnetic members 70, which is attracted by the magnetic force, is supported by the base 46 and provided to face the side of the corresponding one of the movement magnets 66. As the magnetic members 70, a variety of publicly known existing magnetic materials attracted by the magnetic force, such as iron, can be employed.

For convenience of explanation, between the movement magnets 66 respectively provided to the both ends in the axial directions of the cylindrical member 6002, the movement magnet 66 located on the side of the image pickup device 30 will be referred to as the rear movement magnet 66A, and the movement magnet 66 located on the side away from the image pickup device 30 will be referred to as the front movement magnet 66B. Further, between the movement coils 68 respectively provided to the both ends in the axial directions of the cylindrical member 6002, the movement coil 68 located on the side of the image pickup device 30 will be referred to as the rear movement coil 68A, and the movement coil 68 located on the side away from the image pickup device 30 will be referred to as the front movement coil 68B. Further, between the magnetic members 70 respectively provided to the both ends in the axial directions of the cylindrical member 6002, the magnetic member 70 located on the side of the image pickup device 30 will be referred to as the rear magnetic member 70A, and the magnetic member 70 located on the side away from the image pickup device 30 will be referred to as the front magnetic member 70B.

In the present embodiment, a cylindrical member 72 is attached to an end portion of the circumferential wall 4604 of the base 46 to hold the stator 62 in cooperation with the circumferential wall 4604 and to hold one of the movement coils 68.

Subsequently, description will be made of an operation of the movement mechanism 50 to move the rotor 60 between the locking position (FIG. 4) and the unlocking position (FIG. 3). FIG. 10 is an explanatory diagram illustrating the attractive forces and the states of the rear movement coil 68A and the front movement coil 68B observed when the rotor 60 moves between the locking position and the unlocking position.

For convenience of explanation, the forces acting on the rotor 60 will be referred to as first to fourth attractive forces F1 to F4. The first attractive force F1 acts between the rear movement magnet 66A and the rear magnetic member 70A. The second attractive force F2 acts between the front movement magnet 66B and the front magnetic member 70B. The third attractive force F3 acts between the rear movement magnet 66A and the rear movement coil 68A. The fourth attractive force F4 acts between the front movement magnet 66B and the front movement coil 68B.

Further, the term "current supplied" will refer to the state in which the rear movement coil 68A or the front movement coil 68B is supplied with current from the actuator driver 40. Meanwhile, the term "current unsupplied" will refer to the state in which the rear movement coil 68A or the front movement coil 68B is not supplied with current from the actuator driver 40.

As described in (1) of FIG. 10, in a state in which the rotor 60 is located at the locking position (FIG. 4) and both of the rear movement coil 68A and the front movement coil 68B are not supplied with current, a distance d1 between the rear movement magnet 66A and the rear magnetic member 70A is less than a distance d2 between the front movement magnet 66B and the front magnetic member 70B. Thus, the first attractive force F1 is greater than the second attractive force F2.

Therefore, the first attractive force F1 acts on the rotor 60, and thus the state in which the first locking portion 56 engages with the second locking portion 58 is stably maintained. Thereby, the rotation of the rotor 60 and the cam barrel 44 is prevented. The position in the axial directions of the rotor 60 is determined by the engagement of the first locking portion 56 with the second locking portion 58.

Then, as described in (2) of FIG. 10, if current is supplied not to the rear movement coil 68A but to the front movement coil 68B when the rotor 60 is located at the locking position, the first attractive force F1 becomes smaller than the fourth attractive force F4.

As illustrated in FIG. 3, therefore, the rotor 60 is moved forward (in a direction in which the first locking portion 56 separates from the second locking portion 58) by the fourth attractive force F4, and the engagement between the first locking portion 56 and the second locking portion 58 is released. Thereby, the rotor 60 is located at the unlocking position, and the rotation of the rotor 60 and the cam barrel 44 is allowed. The position in the axial directions of the rotor 60 is determined by the contact of an end portion in the axial directions of the rotor 60 with the stopper 4404.

Then, as described in (3) of FIG. 10, if the current supply from the actuator driver 40 to the front movement coil 68B is stopped when the rotor 60 is located at the unlocking position, the first attractive force F1 becomes smaller than the second attractive force F2. This is because, at the unlocking position of the rotor 60, the distance d2 between the front movement magnet 66B and the front magnetic member 70B is less than the distance d1 between the rear movement magnet 66A and the rear magnetic member 70A.

Therefore, the second attractive force F2 acts on the rotor 60, and thus the unlocking position of the rotor 60 is stably maintained.

Further, as described in (4) of FIG. 10, if the current from the actuator driver 40 is supplied only to the rear movement coil 68A when the rotor 60 is located at the unlocking position (FIG. 3), the second attractive force F2 becomes smaller than the third attractive force F3.

As illustrated in FIG. 4, therefore, the rotor 60 is moved rearward (in a direction in which the first locking portion 56 approaches the second locking portion 58) by the third attractive force F3, and the first locking portion 56 and the second locking portion 58 engage with each other. Thereby, the rotor 60 is located at the locking position, and the rotation of the rotor 60 and the cam 44 is prevented. The position in the axial directions of the rotor 60 is determined by the engagement of the first locking portion 56 with the second locking portion 58.

As described in (5) of FIG. 10, if the current supply from the actuator driver 40 to the rear movement coil 68A is stopped when the rotor 60 is located at the locking position, the first attractive force F1 becomes greater than the second attractive force F2. This is because, at the locking position of the rotor 60, the distance d1 between the rear movement magnet 66A and the rear magnetic member 70A is less than the distance d2 between the front movement magnet 66B and the front magnetic member 70B.

Therefore, the first attractive force F1 acts on the rotor 60, and thus the state in which the first locking portion 56 engages with the second locking portion 58 is stably maintained. Thereby, the rotation of the rotor 60 and the cam barrel 44 is prevented. The position in the axial directions of the rotor 60 is determined by the engagement of the first locking portion 56 with the second locking portion 58. That is, the control unit 42 controls the supply and non-supply of current to the rear movement coil 68A and the front movement coil 68B via the actuator driver 40. Thereby, the operations as described in (1) to (5) of FIG. 10 are performed, and the rotor 60 is moved between the locking position and the unlocking position.

As described above, the current supply to the rear movement coil 68A or the front movement coil 68B is necessary only to move the rotor 60 between the locking position and the unlocking position. Thus, in the state in which the rotor 60 is once located at the locking or unlocking position, the current supply to the rear movement coil 68A and the front movement coil 68B is unnecessary. Accordingly, the present embodiment is advantageous in reducing power consumption.

Figure 11:
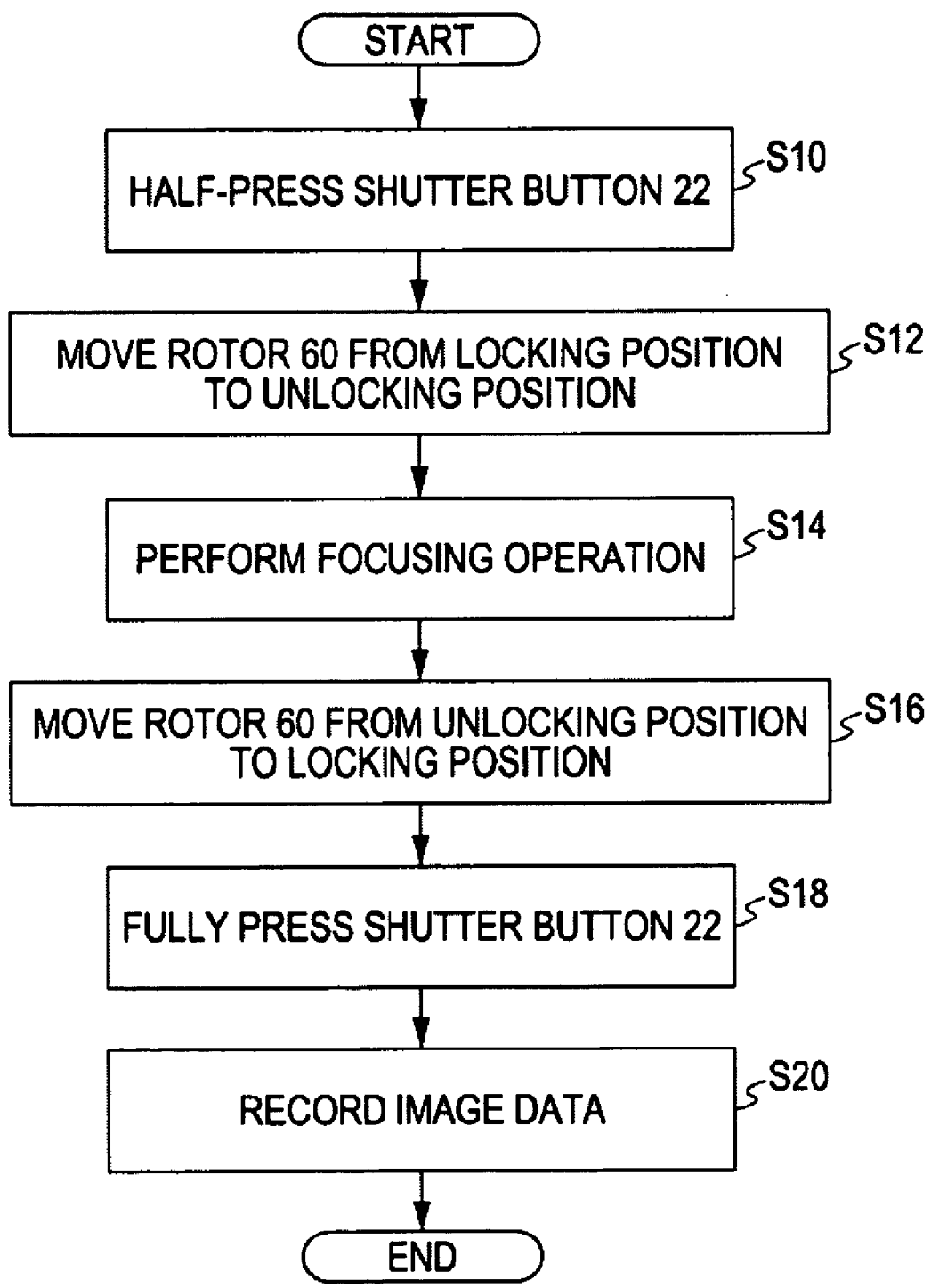
FIG. 11 is an operation flowchart of the lens barrel in an imaging operation.

Subsequently, an operation of the lens barrel 16 performed in an imaging operation will be described with reference to the flowchart of FIG. 11. It is assumed that the imaging apparatus 10 is in a power-on state capable of performing the imaging operation, and that the rotor 60 is located at the locking position.

In the above-described state, a user half-presses the shutter button 22, with the imaging optical system 14 directed to the subject to be imaged (Step S10). Then, the control unit 42 controls the movement mechanism 50 to move the rotor 60 from the locking position to the unlocking position (Step S12). Thereby, the engagement between the first locking portion 56 and the second locking portion 58 is released, and the rotation of the rotor 60 is allowed. The control unit 42 supplies current to the stator coil 64 via the motor driver 38 to drive the hollow motor 48 and rotate the cam barrel 44 together with the rotor 60. Thereby, the lens frame 41 is moved in the optical axis directions of the focusing lens 1404 to perform the focusing operation (Step S14). Upon completion of the focusing operation, the control unit 42 controls the movement mechanism 50 to move the rotor 60 from the unlocking position to the locking position (Step S16). Thereby, the first locking portion 56 and the second locking portion 58 engage with each other, and the rotation of the rotor 60 is prevented. In this state, the user fully presses the shutter button 22 (Step S18). Then, the control unit 42 records the image data generated by the image processing unit 34 on the recording medium 32 (Step S20), and the imaging operation is completed.

As described above, according to the present embodiment, as the rotor 60 is moved in one of the axial directions of the cam barrel 44, the first locking portion 56 provided to the rotor 60 is engaged with the second locking portion 58 provided to the base 46. Thereby, the rotation of the hollow motor 48 is prevented. Due to the prevention of the rotation of the hollow motor 43, therefore, it is of course possible to reliably prevent the focusing lens 1404 from moving in the optical axis directions when external force or impact is applied to the lens barrel 16. In addition, the current supply to the hollow motor 48 is unnecessary to prevent the rotation of the hollow motor 48. Therefore, the present embodiment is advantageous in power saving.

Further, it suffices if the first locking portion 56 and the second locking portion 58 are provided to the rotor 60 of the lens barrel 16 and to the base 46, respectively. Therefore, it is unnecessary to separately provide a special component to the lens barrel 16. Therefore, the present embodiment is substantially advantageous in reducing the size of the lens barrel 16 both in the radial direction and the optical axis direction thereof.

Further, in the present embodiment, the first locking portion 56 is provided to the rear end of the rotor 60, i.e., an end portion in the axial directions of the rotor 60, and the second locking portion 58 is provided to the bottom wall 4602 of the base 46 located rearward of the first locking portion 56. Therefore, a dead space rearward of the lens barrel 16 can be effectively used. This feature is further advantageous in reducing the size of the lens barrel 16.

Further, in the present embodiment, the movement mechanism 50 is simply configured to include the movement magnets 66 respectively provided to the both ends in the axial directions of the outer circumferential surface of the cylindrical member 6002, the movement coils 68 supported by the base 46 to face the respective movement magnets 66, and the magnetic members 70 supported by the base 46 to face the side of the respective movement magnets 66. Therefore, the space in the lens barrel 16 occupied by the movement mechanism 50 is minimized. This feature is further advantageous in reducing the size of the lens barrel 16.

Second Embodiment

A second embodiment will now be described. The second embodiment is different from the first embodiment in that the rotation magnet 61 of the rotor 60 and the first and second magnets (the rear and front movement magnets) 66A and 66B are integrally formed, and is similar to the first embodiment in the other configurations.

Figure 13:
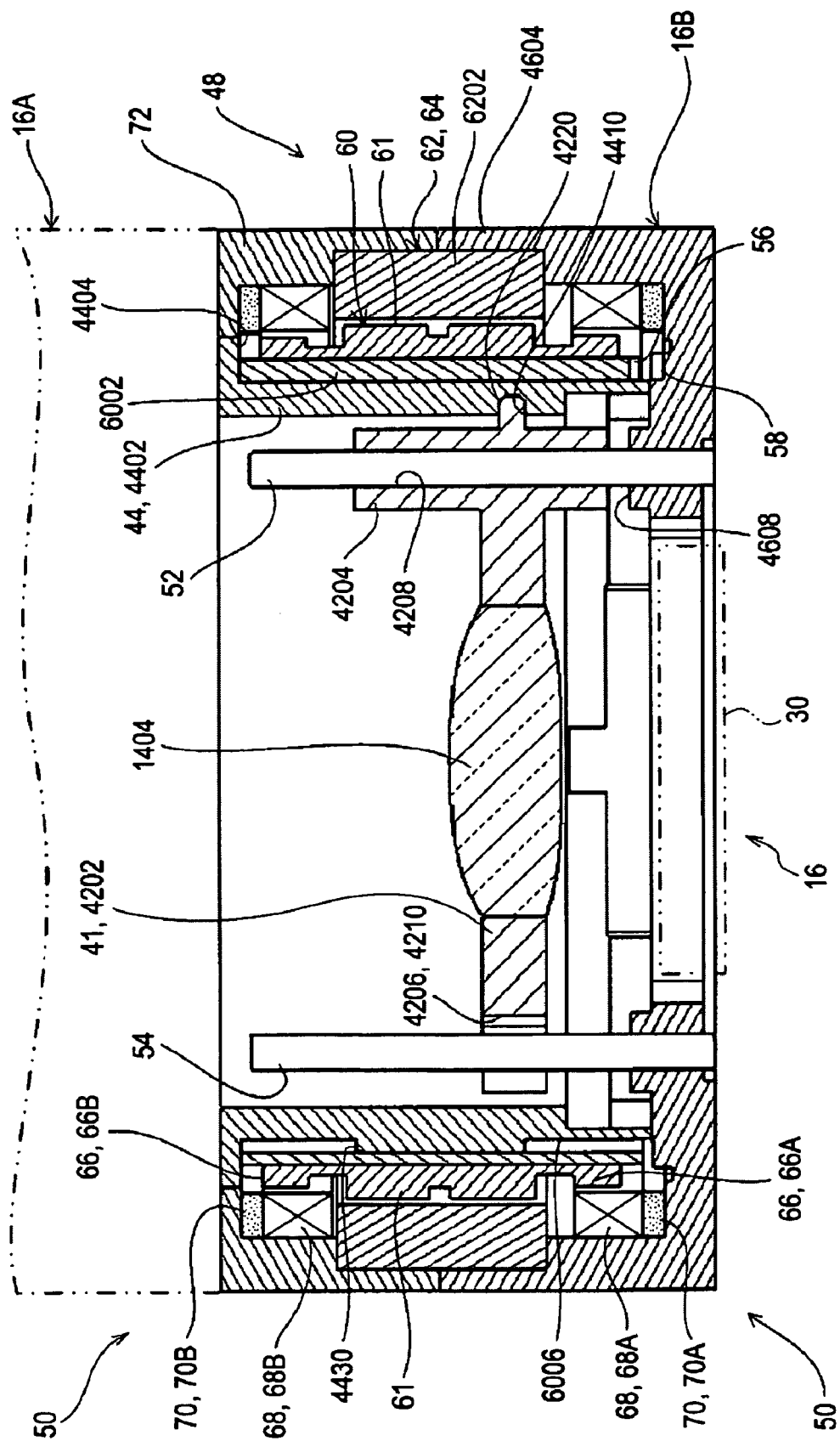
FIG. 13 is a cross-sectional view of the lens barrel, illustrating the unlocking position of the rotor in a second embodiment.

FIG. 13 is a cross-sectional view of the lens barrel 16, illustrating the unlocking position of the rotor 60 in the second embodiment. In the following description, the components the same as or corresponding to the components of the first embodiment will be assigned with the same reference numerals, and description thereof will be omitted.

As illustrated in FIG. 13, the rotation magnet 61 and the first and second magnets 66A and 66B are integrally formed. That is, a rearward portion of the rotation magnet 61 bulges rearward to form the rear movement magnet 66A, and a forward portion of the rotation magnet 61 bulges forward to form the front movement magnet 66B.

Needless to say, the thus configured second embodiment exhibits similar effects to the effects of the first embodiment. Further, due to the integral formation of the rotation magnet 61 and the first and second magnets 66A and 66B, the number of components can be reduced. Therefore, the present embodiment is advantageous in reducing the manufacturing cost.

In the present embodiments, description has been made of the case in which the lens moved via the cam barrel 44 is the focusing lens 1404. However, the lens moved via the cam barrel 44 is not limited to the focusing lens. Thus, the present invention can be widely applied to a lens barrel which moves a variety of publicly known existing lenses moved in the optical axis directions, such as a zoom lens.

Further, in the present embodiments, description has been made of the case in which the hollow motor 48 is a pulse motor. Alternatively, hollow motors of a variety of publicly known existing configurations, such as a DC (Direct Current) motor, can be employed as the hollow motor 48.

Further, in the present embodiments, description has been made of the imaging apparatus 10 as a digital still camera.

However, the present invention is applicable to a variety of imaging apparatuses, such as a video camera and a camera-equipped mobile phone.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
   a lens frame configured to hold a lens and provided to be movable in optical axis directions of the lens;
   a cam barrel provided and rotated around the outer circumference of the lens frame to move the lens frame in the optical axis directions;
   a base configured to support the cam barrel to be rotatable and to be immovable in axial directions thereof; and
   a hollow motor configured to rotate the cam barrel;
   wherein the hollow motor includes
      a cylindrical rotor provided around the outer circumference of the cam barrel and connected to the cam barrel to be movable in the axial directions of the cam barrel and to rotate integrally with the cam barrel, and
      a stator provided to surround the outer circumference of the rotor and supported by the base,
   wherein the rotor is provided with a first locking portion,
   wherein the base is provided with a second locking portion which, in accordance with the movement of the rotor in one of the axial directions of the cam barrel, engages with the first locking portion and prevents the rotation of the rotor, and
   wherein a movement mechanism is provided which moves the rotor in the axial directions of the cam barrel between a locking position at which the first locking portion engages with the second locking portion and an unlocking position at which the first locking portion separates from the second locking portion.

2. The lens barrel according to claim 1,
   wherein the rotor is configured to include
      a cylindrical member connected to the outer circumferential surface of the cam barrel to be movable in the axial directions and to rotate integrally with the cam barrel, and
      a rotation magnet attached to the outer circumferential surface of the cylindrical member, and
   wherein the first locking portion is provided to the cylindrical member.

3. The lens barrel according to claim 2,
   wherein a portion of the cam barrel away from the first locking portion in one of the axial directions is provided with a stopper which comes into contact with the cylindrical member and prevents the cylindrical member from moving in a direction separating from the second locking portion.

4. The lens barrel according to claim 2,
   wherein the outer circumferential surface of the cam barrel is provided with a projection extending in the axial directions,
   wherein the inner circumferential surface of the cylindrical member is provided with an engaging groove which engages with the projection, and
   wherein, in accordance with the engagement between the projection and the engaging groove, the cylindrical member is connected with the cam barrel to be movable in the axial directions of the cam barrel and to rotate integrally with the cam barrel.

5. The lens barrel according to claim 2,
   wherein the movement mechanism includes
      movement magnets respectively provided to both ends in the axial directions of the outer circumferential surface of the cylindrical member, and
      movement coils supported by the base and provided to face the respective movement magnets.

6. The lens barrel according to claim 2,
   wherein the movement mechanism includes
      movement magnets respectively provided to both ends in the axial directions of the outer circumferential surface of the cylindrical member,
      movement coils supported by the base and provided to face the respective movement magnets, and
      magnetic members supported by the base and provided to face the side of the respective movement magnets.

7. The lens barrel according to claim 5 or 6,
   wherein the rotation magnet and the movement magnets are integrally formed.

8. The lens barrel according to claim 1,
   wherein the base includes a bottom wall extending on a plane perpendicular to the axial directions of the cam barrel,
   wherein the lens frame and the cam barrel are disposed forward of the bottom wall in one of the axial directions of the cam barrel separating from the bottom wall,
   wherein the first locking portion is provided to a rear end of the rotor, which is an end portion in the axial directions of the rotor, and
   wherein the second locking portion is provided to a portion of the bottom wall located rearward of the first locking portion.

9. An imaging apparatus including a lens barrel, the lens barrel comprising:
   a lens frame configured to hold a lens and provided to be movable in optical axis directions of the lens;
   a cam barrel provided and rotated around the outer circumference of the lens frame to move the lens frame in the optical axis directions;
   a base configured to support the cam barrel to be rotatable and to be immovable in axial directions thereof; and
   a hollow motor configured to rotate the cam barrel;
   wherein the hollow motor includes
      a cylindrical rotor provided around the outer circumference of the cam barrel and connected to the cam barrel to be movable in the axial directions of the cam barrel and to rotate integrally with the cam barrel, and
      a stator provided to surround the outer circumference of the rotor and supported by the base,
   wherein the rotor is provided with a first locking portion,
   wherein the base is provided with a second locking portion which, in accordance with the movement of the rotor in one of the axial directions of the cam barrel, engages with the first locking portion and prevents the rotation of the rotor, and
   wherein a movement mechanism is provided which moves the rotor in the axial directions of the cam barrel between a locking position at which the first locking portion engages with the second locking portion and an unlocking position at which the first locking portion separates from the second locking portion.

* * * * *